United States Patent
Ghosh

(10) Patent No.: US 11,873,403 B2
(45) Date of Patent: Jan. 16, 2024

(54) ELECTRIC FIELD GRADING COMPOSITION, METHODS OF MAKING THE SAME, AND COMPOSITE ARTICLES INCLUDING THE SAME

(71) Applicant: 3M INNOVATIVE PROPERTIES COMPANY, St. Paul, MN (US)

(72) Inventor: Dipankar Ghosh, Oakdale, MN (US)

(73) Assignee: 3M Innovative Properties Company, St. Paul, MN (US)

(*) Notice: Subject to any disclaimer, the term of this patent is extended or adjusted under 35 U.S.C. 154(b) by 601 days.

(21) Appl. No.: 17/054,208

(22) PCT Filed: May 14, 2019

(86) PCT No.: PCT/IB2019/053991
§ 371 (c)(1),
(2) Date: Nov. 10, 2020

(87) PCT Pub. No.: WO2019/220345
PCT Pub. Date: Nov. 21, 2019

(65) Prior Publication Data
US 2021/0070999 A1    Mar. 11, 2021

Related U.S. Application Data

(60) Provisional application No. 62/672,356, filed on May 16, 2018.

(51) Int. Cl.
C08L 83/04       (2006.01)
H02G 15/064      (2006.01)
(Continued)

(52) U.S. Cl.
CPC ............ *C08L 83/04* (2013.01); *H02G 15/064* (2013.01); *H02G 15/103* (2013.01); *C08K 2003/2248* (2013.01)

(58) Field of Classification Search
CPC .... C08L 83/04; H02G 15/064; H02G 15/103; C08K 2003/2248; H01B 3/46
See application file for complete search history.

(56) References Cited

U.S. PATENT DOCUMENTS 4,234,439 A    11/1980  Kehr
4,363,842 A    12/1982  Nelson
(Continued)

FOREIGN PATENT DOCUMENTS

WO    WO 2011-081795    7/2011
WO    WO 2013-094610    6/2013
(Continued)

OTHER PUBLICATIONS

Ghosh, "Embedded Nonlinear Passive Components on Flexible Substrates for Microelectronics Applications", Journal of Materials Science: Materials in Electronics, Aug. 2017, vol. 28, No. 15, pp. 11550-11556.
(Continued)

*Primary Examiner* — Hoa C Nguyen
*Assistant Examiner* — John B Freal
(74) *Attorney, Agent, or Firm* — Bradford B. Wright

(57) ABSTRACT

Electric field grading compositions comprise a particulate cupric oxide dispersed in a matrix material, wherein the electric field grading composition has a threshold voltage, a breakdown voltage, and exhibits a reversible electric field switchable current-voltage relationship that substantially follows the equation:

$$I = kV^\alpha$$

wherein: I is current in amperes; k is a constant greater than 0; V is applied voltage in volts, wherein V is between the threshold voltage and the breakdown voltage, inclusive; and $\alpha$ is a real number greater than 1. The electric field grading composition is useful for reducing electric field stress at a (Continued)

joint or termination of a conductive substrate. Articles including the electric field grading disposed on a surface of a conductive substrate are also disclosed.

5 Claims, 2 Drawing Sheets

(51) Int. Cl.
*H02G 15/103* (2006.01)
*C08K 3/22* (2006.01)

(56) References Cited

U.S. PATENT DOCUMENTS

| | | | |
|---|---|---|---|
| 4,431,861 | A | 2/1984 | Clabburn |
| 4,470,898 | A * | 9/1984 | Penneck ............ H02G 15/068 252/514 |
| 5,492,681 | A | 2/1996 | Pasek |
| 6,124,549 | A | 9/2000 | Kemp |
| 6,228,767 | B1 | 5/2001 | Yakura |
| 8,435,427 | B2 | 5/2013 | Ghosh |
| 8,974,706 | B2 | 3/2015 | Somasiri |
| 9,704,613 | B2 | 7/2017 | Ghosh |
| 9,876,342 | B2 | 1/2018 | Ghosh |
| 2011/0140052 | A1 | 6/2011 | Somasiri |
| 2012/0049135 | A1 * | 3/2012 | Ghosh ..................... H01B 1/22 252/519.21 |
| 2014/0287175 | A1 | 9/2014 | Krawiec |
| 2016/0218498 | A1 | 7/2016 | Ghosh |

FOREIGN PATENT DOCUMENTS

| | | | |
|---|---|---|---|
| WO | WO 2015-047769 | 4/2015 | |
| WO | WO 2016-061230 | 4/2016 | |
| WO | WO-2016061230 A1 * | 4/2016 | ............... C09J 7/00 |
| WO | WO 2018-081394 | 5/2018 | |
| WO | WO 2018-102254 | 6/2018 | |

OTHER PUBLICATIONS

Donzel, "Silicone Composites for HV Applications Based on Microvaristors" Proceedings of the 2004 IEEE International Conference on Solid Dielectrics, 2004. ICSD 2004, Toulouse, France, 2004, vol. 1, pp. 403-406.
International Search Report for PCT International Application No. PCT/IB2019/053991, dated Sep. 4, 2019, 4 pages.

* cited by examiner

ELECTRIC FIELD GRADING COMPOSITION, METHODS OF MAKING THE SAME, AND COMPOSITE ARTICLES INCLUDING THE SAME

TECHNICAL FIELD

The present disclosure broadly relates to electric field grading compositions, methods of using them, and articles including them.

BACKGROUND

Electric field grading, or electrical stress control, refers to the technique of reducing local enhancements of the electric field in various devices, especially electrical power cable accessories. As a part of insulation coordination, electrical field grading is especially important as voltage levels are increasing and sizes of components are shrinking. Criteria such as cost, safety issues, low electric fields, and temperatures are often contradictory. For example, thinner insulation leads to lower material costs and lower temperatures but to higher electric fields, which can lead to electric breakdown and failure, particularly at critical regions such as interfaces or triple points. Appropriate field grading can help attain or improve and optimize a design that appropriately balances such criteria.

Field grading methods generally fall into two main classes: a) capacitive field grading (e.g., geometrical electrode grading with appropriate shape of conductive parts, refractive grading with high-permittivity materials, and condenser grading with integration of metallic elements); and b) resistive field grading, using special materials with appropriate current-field characteristics. This simple classification is based on whether the displacement (i.e., capacitive current, or resistive current) dominates the field grading mechanism.

Resistive field grading materials generally become more conductive at elevated levels of electric field values. Usually, capacitive field grading materials have relatively high dielectric constant and low dielectric loss. Both kinds of materials can avoid failure at the critical region by redistributing the electrical field at extreme conditions.

U.S. Pat. No. 8,974,706 (Somasiri et al.) describes electrical stress control technology using conductive carbon black and high dielectric constant ceramic barium titanate/polymer composites.

The electrical conductivity of such compositions may depend on percolation properties of the conductive filler particles (e.g., the resistivity of such materials is very sensitive on small fluctuations of parameters that influence particle dispersion), and thus processing and manufacturing parameters typically need to be carefully controlled for making such compositions.

U.S. Pat. No. 6,124,549 (Kemp et al.) discloses another approach based on using varistor powder (e.g., doped ZnO) and filler particles materials disposed in a polymeric matrix. Relatively high particle loading levels in systems of this type are generally required to see electric field switchable properties of the composites.

SUMMARY

The present disclosure describes another approach for stress control using electric field grading compositions based on particulate cupric oxide filler dispersed in a dielectric matrix. These electric field grading compositions show reproducible electric field switchable electrical conductivity with respect to electric field.

In one aspect, the present disclosure provides an electric field grading composition comprising a particulate cupric oxide dispersed in a matrix material, wherein the electric field grading composition has a threshold voltage, a breakdown voltage, and exhibits a reversible electric field switchable current-voltage relationship that substantially follows the equation (i.e., Power Law):

$$I = kV^\alpha$$

wherein:
I is current in amperes;
k is a constant greater than 0;
V is applied voltage in volts, wherein V is between the threshold voltage and the breakdown voltage, inclusive; and
$\alpha$ is a real number greater than 1.

In some preferred embodiments, $\alpha$ is at least 1.5, preferably at least 2, more preferably at least 4, and even more preferably at least 7.

In another aspect, the present disclosure provides a method of reducing electric field stress at a joint or termination of a conductive substrate, the method comprising applying the electric field grading composition according to the present disclosure to a surface of the conductive substrate.

In yet another aspect, the present disclosure provides a composite article comprising an electric field grading composition according to the present disclosure disposed on a surface of a conductive substrate.

As used herein:

"electric field grading composition" means a composition having an electrical resistivity that vanes with applied voltage such that it has an electric field switchable, non-ohmic current/voltage characteristic for two directions of traversing current. Typical temperatures of operation are between −50° C. to +180° C. At low voltage levels (<90V-100 V) the electric field grading composition has a high electrical resistivity which decreases as the voltage is raised beyond the threshold level (100V-225V) but below the dielectric breakdown voltage.

Features and advantages of the present disclosure will be further understood upon consideration of the detailed description as well as the appended claims.

Figure 1:
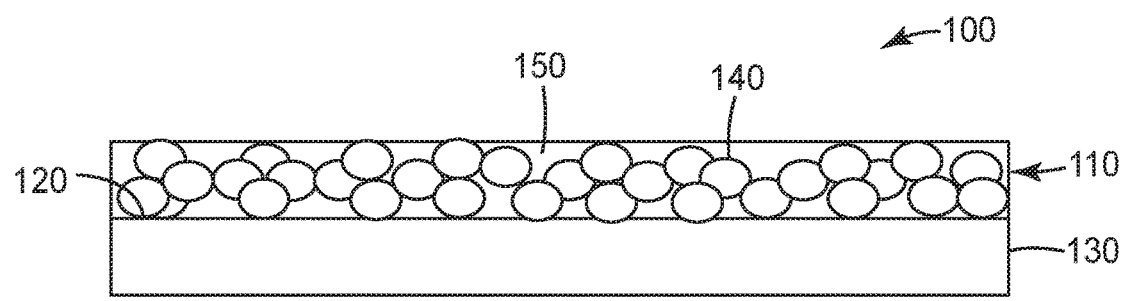
FIG. 1 is a schematic side view of a composite article 100 including an electric field grading composition according to the present disclosure.

Repeated use of reference characters in the specification and drawings is intended to represent the same or analogous features or elements of the disclosure. It should be understood that numerous other modifications and embodiments can be devised by those skilled in the art, which fall within the scope and spirit of the principles of the disclosure. The figures may not be drawn to scale.

DETAILED DESCRIPTION

Electric field grading compositions according to the present disclosure include a matrix material having particulate cupric oxide dispersed therein. The matrix material forms a typically continuous phase in which the particulate cupric oxide is dispersed.

The matrix material into which the particulate cupric oxide is dispersed can comprise any suitable organic polymeric material or ceramic material, and optionally one or more additional organic or inorganic components. Suitable matrix materials are preferably essentially electrically non-conductive (i.e., electrically insulating) materials. Useful matrix materials may include, e.g., any dielectric materials useful in the electronic arts. Suitable dielectric materials include dielectric polymeric materials such as thermoplastic polymers and uncured or at least partially cured polymeric resins, and combinations thereof.

In some embodiments, the matrix material may comprise ceramic materials such as, for example alumina, zirconia, silica, and combinations thereof.

In some embodiments, the matrix material may comprise a thermoplastic composition, which may be raised to a sufficiently high temperature that the flakes of a particulate cupric oxide can be adequately compounded into it, and then cooled to form a solidified article. Examples of suitable thermoplastic compositions include filled or unfilled, polyurethanes, thermoplastic silicone vulanisates, EVA (ethylene-vinyl acetate) based polymers, EPDM (ethylene-propylene-diene rubber), olefinic polymers (e.g., polyethylene or polypropylene), polyesters, polycarbonates, and combinations thereof.

In some embodiments, the matrix material may comprise an organic thermoset material into which the particulate cupric oxide can be dispersed, and which can then be cured by any suitable means (e.g., thermal energy, actinic radiation, addition of catalysts and/or initiators) to form a solid article. Examples of suitable curable polymeric resins that may be cured include urethane resins; silicone resins; epoxy resins; isocyanate resins, cyanate resins; phenolic resins; and combinations thereof. In some preferred embodiments, the matrix material comprises a cured silicone polymer.

Particulate cupric oxide is dispersed in the matrix material. A majority of the particulate cupric oxide (e.g., at least 50 weight percent, at least 60 weight percent, at least 70 weight percent, at least 80 weight percent, at least 90 weight percent, at least 99 weight percent, or even all) is in the form of cupric oxide and/or doped cupric oxide. The copper oxide particles may have any shape. Commercially available cupric oxide is available, for example, as spherical powders or as needles. In some embodiments, cupric oxide particles may have an average aspect ratio (i.e., the ratio of length to thickness) of at least 5, at least 10, at least 20, or even at least 50, for example. The electric field grading composition may have anisotropic conductivity under an applied electric field (voltage drop for fixed geometries). For example, good conductivity may be observed in X and Y directions, but not in the Z direction.

The particulate cupric oxide (i.e., CuO) may contain impurities other than cupric oxide, preferably in amounts of less than or equal to 3 percent by weight, preferably less than or equal to 2 percent by weight, more preferably less than 1 percent by weight, and even more preferably less than 0.1 percent by weight. In some cases, the impurities may be dopant(s). In the case of included dopants such as $Ga^{3+}$, $Al^{3+}$, $K^+$, $Na^+$, or $Li^+$, the dopants may alter the threshold voltage at which the Power Law behavior occurs. If present, dopants are generally present at a concentration of less than 100 part per million (ppm), although his is not a requirement. Combinations of dopants may also be used.

Likewise, the particulate cupric oxide may contain other impurities as long as the overall particulate cupric oxide still obeys the abovementioned Power Law.

High purity particulate cupric oxide may be obtained from commercial sources (e.g., Sigma-Aldrich, Saint Louis, Missouri or American Elements, Los Angeles, California) or made according to known procedures, for example, as described in U.S. Pat. No. 5,492,681 (Pasek et al.).

The amount of particulate cupric oxide in the electric field grading composition may be any value that imparts an electric field switchable increasing conductance in response to increasing electric field according to the abovementioned Power Law. The amount may be affected by the particle size, particle shape, and particle orientation.

Preferably, the amount of the particulate cupric oxide present is from 5 to 50 weight percent, more preferably 10 to 40 weight percent, and even more preferably 50 to 75 weight percent, based on the total weight of the electric field grading composition although higher and lower amounts may also be used.

The resulting electric field grading composition might be stiff and rigid, or might be relatively elastomeric. However, it is not strictly necessary that the resulting composition be solid. Rather, it might be a semi-solid, grease, gel, wax, mastic, or even an adhesive (e.g., a pressure-sensitive adhesive), if desired.

Electric field grading compositions according to the present disclosure may also comprise any other suitable additive(s), for example to improve processability, weatherability, and so on. Potentially useful additives may include, for example, dispersing agents, processing aids, mold release agents, stabilizers, conductive or nonconductive fillers, antioxidants, colorants, and plasticizers. In certain embodiments, the conductive filler may be a graphene-based material (e.g., graphene, doped graphene, functionalized graphene, exfoliated graphite, graphene nanoplatelets, or graphite nanoplatelets). In some embodiments, a conductive filler may be present in the form of carbon black. However, in other embodiments, the electric field grading composition is substantially free of carbon black. In some embodiments, the electric field grading composition is substantially free of any type of conductive material. In some embodiments, one or more additional conductive materials may be present in the electric field grading composition. Any suitable particulate conductive material may be used. In some embodiments, the conductive filler particles may comprise an aspect ratio of at least about 5, 10, 100, or higher.

In some embodiments, one or more additional nonconductive (insulating) materials such, for example, as silica, alumina, zirconia, and zircoaluminates may also be present.

In some embodiments, one or more additional conductive materials may be present in the electric field grading composition. Any suitable particulate conductive material may be used. In some embodiments, the conductive filler particles may comprise an aspect ratio of at least about 5, 10, 100, or higher.

The particle size of any such additive that is active in performing electric field grading may be chosen as desired. In various embodiments, such an additive may comprise an average particle size of no more than about 200, 100, 40, or 20 microns. In further embodiments, such an additive may have an average particle size of at least about 0.1, 1, 2, 4, 8, or 16 microns. If desired, any such additive may comprise any suitable surface treatment or the like that enhances the ability of the particles to be dispersed into a desired polymer matrix. For example, the particles may be treated or coated with hydrophobic groups. In some embodiments, an electric field grading composition may include nanoparticles, in the general manner as described in U.S. Patent Appln. Publ. 2011/0 140052 (Somasiri).

The electric field grading composition may be dissolved and/or suspended in solvent (e.g., an organic solvent) to facilitate processing (e.g., if the electric field grading composition is not fluid); however, most or all solvent is typically removed before use in a finished electronic article.

Electric field grading compositions according to the present disclosure may be made by simple mixing of the components (e.g., matrix material or a precursor thereof, particulate cupric oxide, and any optional ingredients). If desired, organic solvent may be used to reduce viscosity, although it should typically be subsequently removed after compounding, and optionally coating. If a matrix material precursor (e.g., a curable organic resin) is included, then a curing step or steps may be included before and/or after removal of the solvent. Examples of suitable solvents include ethers, ketones, esters, and halocarbons.

Electric field grading compositions according to the present disclosure may further comprise a high dielectric permittivity ceramic material having a dielectric permittivity value greater than 50 (preferably greater than 75, and more preferably greater than 100). Examples include barium titanate, titanium oxide, barium strontium titanate, and strontium titanate.

The electric field grading composition may be used directly (e.g., as a paste or gel) or it may be coated, by any suitable technique onto a surface of a substrate, resulting in a composite article. Referring now to FIG. 1, composite article 100 comprises electric field grading composition 110 disposed on surface 120 of substrate 130. Electric field grading composition 110 includes particulate cupric oxide 140 dispersed in matrix material 150.

Any solid substrate may be used; however, electric field grading compositions according to the present disclosure are advantageously used on substrates that are conducting and preferably capable of carrying a substantial current load and high voltage. Examples include exposed power cables (e.g., cable splices and cable terminations), and interior surfaces of switch housings (e.g., gas insulator switch housings). Electric field grading compositions according to the present disclosure may also be useful in surge protectors due to their electric field switchable conductivity.

The electric field grading compositions of the present disclosure can be used in various articles for various applications, for example, spray, coating, mastics, tapes, and shaped bodies having a definite configuration. The electric field grading compositions of the present disclosure are particularly suitable for use in electrical stress control elements or devices such as high voltage cable accessories, wherein the electric field switchable dielectric properties of the compositions are useful.

Electrical stress control devices can be manufactured which are designed with respect to their dielectric properties and their geometric configurations in accordance with desirable modifications of an electric field present at the respective site of application. These stress control devices consist at least partly of the composition of the disclosure. Particularly useful is a dielectric stress control device or element which consists of a shaped body, preferably a sleeve, which can be placed onto an end of a cable insulation and/or shield. Stress control devices or elements having other geometric configurations may be useful to prevent unacceptably high local field concentrations, for example in break elbows, transition or throughgoing connections, feedthroughs and branchings of high tension cables. In certain cable terminations, electric field switchable resistive field grading tubes are used in combination with capacitive stress cones.

The electric field grading compositions can be provided as (e.g., shaped into) articles of any suitable form. For example, such electric field grading compositions may be molded into shaped articles of any form (e.g., flat sheets, tubing or sheathing, plugs, hollow cones). If provided as a pliable layer, or as a grease, wax, gel or mastic, the electric field grading composition may be shaped in the field as desired. In some embodiments, such an electric field grading composition may be provided as a layer of a multilayer electrical stress control device, with the thickness of a layer being designed as needed. For example, such a layer may be provided as part of a co-extruded annular article. In some embodiments, a composite article comprising such an electric field grading composition may be provided along with one or more ancillary devices, e.g., one or more connectors or terminations for an electric power cable.

The electric field grading compositions disclosed herein may be suitable for use in various electrical stress control applications, because of their ability to provide a reversible non-linear current-voltage relationship. This reversibility is illustrated, for example, in FIGS. 3 and 4, which show conductivity-electric field curves both as the electric field increases and as it decreases. Electric field grading compositions disclosed herein can, if desired, be repeatedly exposed to increasing and decreasing voltages and may exhibit similar (though not necessarily identical) behaviors each time as long as the voltage does not exceed the electric field grading composition's irreversible breakdown voltage.

The electric field grading compositions disclosed herein may be particularly suitable for use in voltage regulator applications, such as surge arresters, and/or in applications involving electrostatic discharge suppression. And, as mentioned, such electric field grading compositions can advantageously mitigate or reduce the effect of electrical stress and may be used, e.g., in terminations and connectors for electrical power cables. In some applications, the herein-disclosed electric field grading compositions may serve in combinations of these functions.

Select Embodiments of the Present Disclosure

In a first embodiment, the present disclosure provides electric field grading composition comprising a particulate cupric oxide dispersed in a matrix material, wherein the electric field grading composition has a threshold voltage, a breakdown voltage, and exhibits a reversible electric field switchable current-voltage relationship that substantially follows the equation:

$$I = kV^\alpha$$

wherein:
I is current in amperes;
k is a constant greater than 0;
V is applied voltage in volts, wherein V is between the threshold voltage and the breakdown voltage, inclusive; and
α is a real number greater than 1.

In a second embodiment, the present disclosure provides an electric field grading composition according to the first embodiment, wherein the particulate cupric oxide contains up to 3 weight percent of at least one dopant.

In a third embodiment, the present disclosure provides an electric field grading composition according to the first or second embodiment, wherein the electric field grading composition further comprises a high dielectric permittivity ceramic material having a dielectric permittivity value greater than 50.

In a fourth embodiment, the present disclosure provides an electric field grading composition according to any one of the first to third embodiments, further comprising electrically conducting or electrically semiconducting particles dispersed in the matrix material.

In a fifth embodiment, the present disclosure provides an electric field grading composition according to any one of the first to fourth embodiments, wherein the matrix material comprises at least one of thermoplastic polymer, thermoplastic elastomer, or curable compound.

In a sixth embodiment, the present disclosure provides an electric field grading composition according to any one of the first to fifth embodiments, wherein the particulate cupric oxide is present in an amount of from 5 to 80 percent by weight, based on the total weight of the electric field grading composition.

In a seventh embodiment, the present disclosure provides an electric field grading composition according to any one of the first to sixth embodiments, wherein the particulate cupric oxide is present in an amount of from 30 to 80 percent by weight, based on the total weight of the electric field grading composition.

In an eighth embodiment, the present disclosure provides an electric field grading composition according to any one of the first to sixth embodiments, wherein the particulate cupric oxide is present in an amount of from 50 to 75 percent by weight, based on the total weight of the electric field grading composition.

In a ninth embodiment, the present disclosure provides an electric field grading composition according to any one of the first to eighth embodiments, wherein the matrix material comprises a curable composition.

In a tenth embodiment, the present disclosure provides an electric field grading composition according to the ninth embodiment, wherein the curable composition comprises at least one of natural rubber, silicone, ethylene propylene diene rubber, ethylene propylene rubber, polyester, epoxy resin, polyesterimide, polyamideimide, or polyimide.

In an eleventh embodiment, the present disclosure provides an electric field grading composition according to any one of the first to tenth embodiments, further comprising organic solvent.

In a twelfth embodiment, the present disclosure provides a method of reducing electric field stress at a joint or termination of a conductive substrate, the method comprising applying the electric field grading composition of any one of the first to eleventh embodiments to a surface of the conductive substrate.

In a thirteenth embodiment, the present disclosure provides a method according to the twelfth embodiment, wherein the conductive substrate comprises the joint or termination of an electric cable.

In a fourteenth embodiment, the present disclosure provides a method according to the twelfth or thirteenth embodiment, wherein said applying the electric field grading composition comprises extruding or injection molding the electric field grading composition to form a composite article.

In a fifteenth embodiment, the present disclosure provides a composite article comprising an electric field grading composition according to any one of the first to eleventh embodiments disposed on a surface of a conductive substrate.

In a sixteenth embodiment, the present disclosure provides a composite article according to the fifteenth embodiment, wherein the conductive substrate comprises a housing, and wherein the surface of the conductive substrate comprises an interior surface of the housing.

In a seventeenth embodiment, the present disclosure provides a composite article according to the fifteenth or sixteenth embodiment, wherein the conductive substrate comprises at least a portion of an electrical cable splice, electrical cable termination, gas-insulated switchgear tank, surge arrester for electrostatic discharge protection, or a transformer insulation.

In an eighteenth embodiment, the present disclosure provides a composite article according to the fifteenth or sixteenth embodiment, wherein the composite article comprises a device for protecting electrical equipment against transient electrical surges.

In a nineteenth embodiment, the present disclosure provides a composite article according to the fifteenth or sixteenth embodiment, wherein the electric field grading composition is disposed on a major surface of a tape backing.

In a twentieth embodiment, the present disclosure provides a composite article according to any one of the fifteenth to nineteenth embodiments, wherein the electric field grading composition is molded, extruded, or sprayed onto the conductive substrate.

In a twenty-first embodiment, the present disclosure provides a composite article according to any one of the fifteenth to twentieth embodiments, wherein the electric field grading composition comprises a liquid dispersion, a gel, a putty, or a grease.

Objects and advantages of this disclosure are further illustrated by the following non-limiting examples, but the particular materials and amounts thereof recited in these examples, as well as other conditions and details, should not be construed to unduly limit this disclosure.

EXAMPLES

Unless otherwise noted, all parts, percentages, ratios, etc. in the Examples and the rest of the specification are by weight. Materials used in the Examples were purchased from commercial sources (e.g., Sigma-Aldrich Chemical Co., St. Louis, Missouri) and/or may be obtained by known methods. Table 1 (below) lists materials used in the examples and their sources.

TABLE 1

| DESIGNATION | DESCRIPTION | SOURCE |
|---|---|---|
| CuO 1 | Cupric oxide (copper(II) oxide) powders, 99% purity | Alfa Aesar, Haverhill, Massachusetts |
| CuO 2 | Cupric oxide (copper(II) oxide) powders, minimum 98% purity | American Chemet Corporation, Deerfield, Illinois |
| 184 SIL ELAST | Two-part liquid polymer obtained as DOW CORNING SYLGARD 184 SILICONE ELASTOMER | Dow Corning, Midland, Michigan |

Current/Voltage (I-V) and DC Electric Field Measurement Test Method

The current/voltage (I-V) and DC electric field characteristics of the PDMS composites were determined using an automated and safety enclosed\measurement setup consisting of a Keithley 6485 programmable picoammeter, a Keithley 2290-10 high voltage power supply and a USB-GPIB device which connects the picoammeter and power supply to a computer. The measurement setup can apply potential on samples up to 10 kilovolts (kV). The measurements were carried out using a step voltage ramp (both up and down ramp), where the current was measured at the end of each voltage step. All the measurements were done at room temperature.

Dielectric Characteristic Measurement Test Method

The frequency response of the resulting article was also evaluated, using an Agilent E4980A Precision LCR meter at room temperature.

Examples 1 and 2 (EX-1 and EX-2) and Comparative Example A (CEX-A)

A polydimethylsiloxane (PDMS) elastomeric matrix was used as the base matrix for making the composites. A mixture of PDMS elastomer base (SYLGARD 184 base, Dow Corning) and curing agent (SYLGARD 184 silicone elastomer curing agent, Dow Corning) was placed into a small plastic container (9:1 weight ratio, respectively) along with the appropriate amount of cupric oxide (CuO) filler material (as reported in Table 2). A speed mixer (DAC 150 FVZ, Siemens) was used (2000 revolutions per minute (rpm) for 60 seconds) to disperse the filler powder in the liquid silicone mixture. The resulting mixture was poured into a circular aluminum mold and heated to 150° C. in a convection oven for 1 hour.

TABLE 2

| EXAMPLE | MATRIX | CuO 1, wt. % (vol. %) | CuO 2, wt. % (vol. %) |
|---|---|---|---|
| CEX-A | 184 SIL ELAST | — | — |
| EX-1 | 184 SIL ELAST | — | 60 (20) |
| EX-2 | 184 SIL ELAST | 72 (30) | — |

Subsequently, the resulting composition was then sandwiched between a pair of aluminum plates and the entire stack was placed into a Carver Laboratory Press (Model No. 2699, Carver, Inc., Wabash, Indiana). The press was used to apply a force of approximately 6 metric tons for thirty minutes (with the sample being held at room temperature). The temperature of the sample was then increased to 100° C. for four hours. Aluminum plates (and spacers as needed) of a variety of different thicknesses were used. The resulting composites were flexible solid sheets that ranged from approximately 1.0 mm to 2.0 mm in average thickness.

Tables 3 and 4 report the approximate nonlinear regime onset for CEX-A, EX-1, and EX-2.

TABLE 3

| ELECTRIC FIELD GRADING COMPOSITION | APPROXIMATE NONLINEAR REGIME ONSET (THRESHOLD VOLTAGE RANGE), volts |
|---|---|
| CEX-A | none |
| EX-1 | 172-222 |
| EX-2 | 150-180 |

Figure 2:
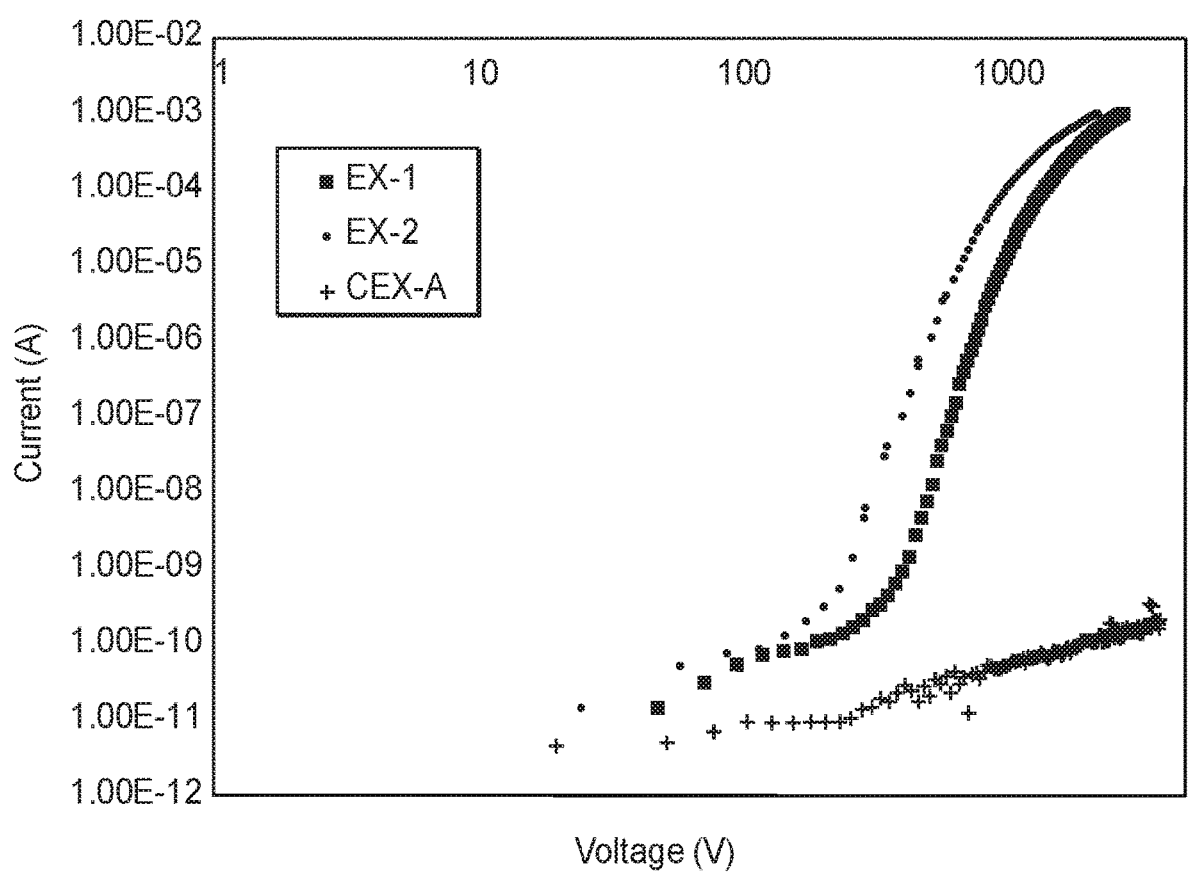
FIG. 2 is a plot of current versus applied voltage for the comparative electric field grading composition CEX-A.

FIG. 2 shows the pure PDMS matrix (CEX-A) linear dependence of the current with respect to the changing voltage. A "linear" material generally obeys Ohm's law (V=IR, where R is the resistance), such that the current flowing through the material is linearly proportional to the applied voltage, before dielectric breakdown voltage is reached.

However, the voltage (V) across the EX-1 and EX-2 materials and the current (I) that passed through them are related by the Power Law discussed hereinbefore.

At low applied electric fields, the EX-1 and EX-2 compositions demonstrated linear I-V characteristic (i.e. current varies linearly with change in voltage). With increasing electric field, and after crossing the so-called threshold voltage level range and before dielectric breakdown voltage is reached, the current changed rapidly in a nonlinear fashion resulting in current value changes by several orders of magnitudes. This gives power law coefficient values of $\alpha=7-10$.

Figure 3:
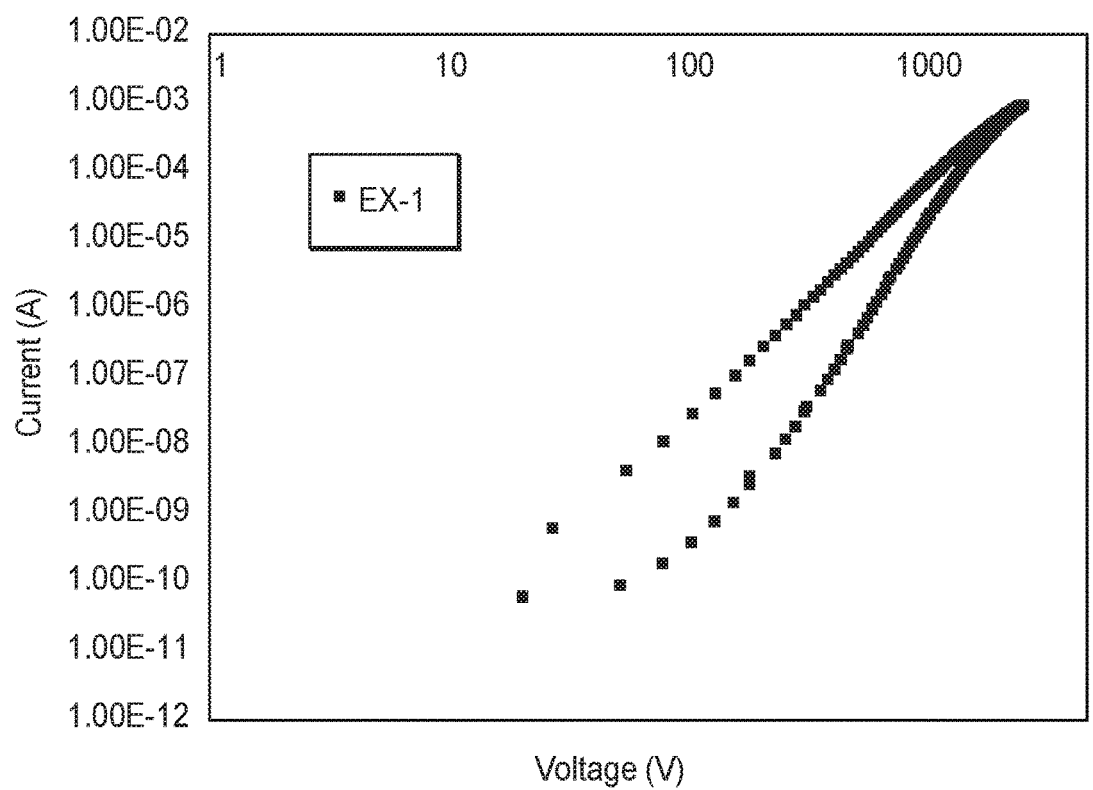
FIG. 3 is a plot of current versus applied voltage for the electric field grading composition EX-1.
Figure 4:
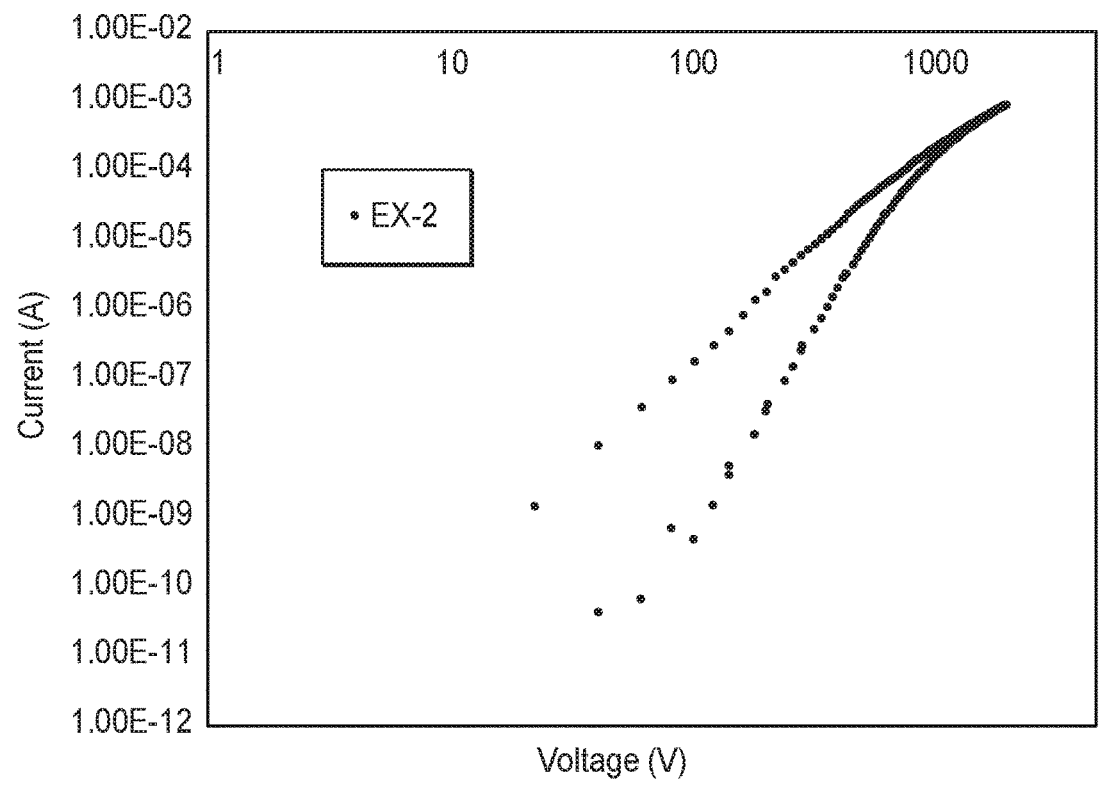
FIG. 4 is a plot of current versus applied voltage for the electric field grading composition EX-2.

The composite materials demonstrate conductivity that is dependent on applied electric field. Therefore, the bulk intrinsic power law abiding electrical properties of the CuO are effectively imparted to the composite. FIG. 2 demonstrates that the threshold voltage for power law abiding conduction decreases as the CuO loading level is increased (from 60 wt. % to 72 wt. %) which is as expected from percolation theory. FIGS. 3 and 4 demonstrate the reversible nature of the current voltage characteristics of the composites EX-1 and EX-2.

TABLE 4

| ELECTRIC FIELD GRADING COMPOSITION | APPROXIMATE NONLINEAR REGIME ONSET (THRESHOLD VOLTAGE RANGE), Volts |
|---|---|
| EX-1 | 108-120 |
| EX-2 | 90-105 |

Table 5 (below) shows the dielectric characteristics with respect to frequency for the PDMS composite samples comprising CuO filler.

TABLE 5

| ELECTRIC FIELD GRADING COMPOSITION | DIELECTRIC PERMITTIVITY AT DIFFERENCE FREQUENCIES | | | |
|---|---|---|---|---|
| | 60 Hz | 1 kHz | 10 kHz | 100 kHz |
| EX-1 | 7.22 | 7.14 | 7.08 | 6.98 |
| EX-2 | 9.90 | 9.54 | 9.44 | 9.39 |

Table 5 shows that CuO filled composites have moderate to high dielectric permittivity values (7-10) in the frequency range of interest. High dielectric permittivity composites are desirable to demonstrate capacitive field grading.

Electric field grading compositions according to the present disclosure have field-dependent conductivity. Thus, the conductivity of an electric field grading composition can vary by orders of magnitude with only small changes in applied electrical field, which can be used to our advantage while designing for electrical stress control applications. Accordingly, the electric field grading compositions are particularly suitable for use in electrical stress control applications.

The preceding description, given in order to enable one of ordinary skill in the art to practice the claimed disclosure, is not to be construed as limiting the scope of the disclosure, which is defined by the claims and all equivalents thereto.

What is claimed is:

1. A composite article consisting of an electric field grading composition disposed on a surface of a conductive substrate, wherein the conductive substrate comprises a switch housing or at least a portion of an electrical cable splice, electrical cable termination, surge arrester for electrostatic discharge protection, or a transformer insulation, and wherein the electric field grading composition comprises a particulate cupric oxide dispersed in a matrix material, wherein the electric field grading composition has a threshold voltage, a breakdown voltage, and exhibits a reversible electric field switchable current-voltage relationship that substantially follows the equation:

$$I=kV^{\alpha}$$

wherein:
- I is current in amperes;
- k is a constant greater than 0;
- V is applied voltage in volts, wherein V is between the threshold voltage and the breakdown voltage, inclusive; and
- $\alpha$ is a real number greater than 1.

2. The composite article of claim 1, wherein the surface of the conductive substrate comprises an interior surface of the switch housing.

3. The composite article of claim 1, wherein the conductive substrate comprises at least a portion of an electrical cable splice, electrical cable termination, gas-insulated switchgear tank, surge arrester for electrostatic discharge protection, or a transformer insulation.

4. The composite article of claim 1, wherein the electric field grading composition is molded, extruded, or sprayed onto the conductive substrate.

5. The composite article of claim 1, wherein the electric field grading composition comprises a putty or a grease.

* * * * *